Oct. 8, 1957
STINA SIGNE BIRGITTA RAHM BORN CARLSON
2,809,143
METHOD OF MAKING HIGH-STRENGTH JOINTS IN LINED CONTAINERS
Filed Nov. 24, 1953
2 Sheets-Sheet 1
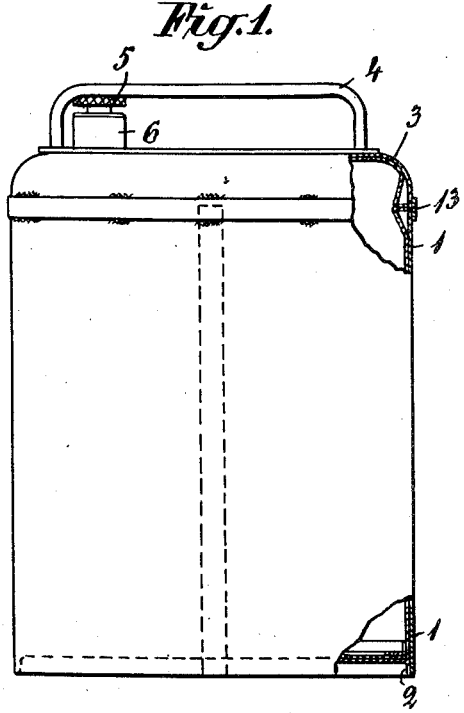
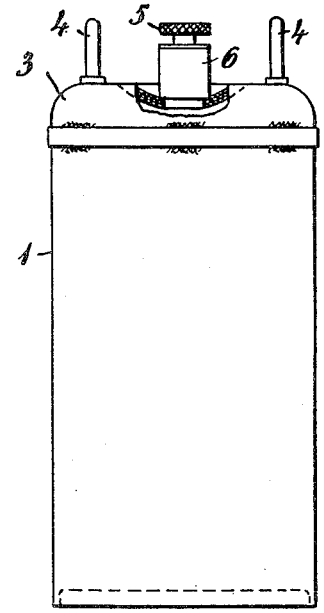
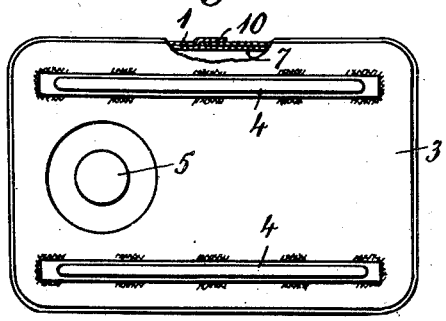

Oct. 8, 1957
STINA SIGNE BIRGITTA RAHM BORN CARLSON
2,809,143
METHOD OF MAKING HIGH-STRENGTH JOINTS IN LINED CONTAINERS
Filed Nov. 24, 1953
2 Sheets-Sheet 2
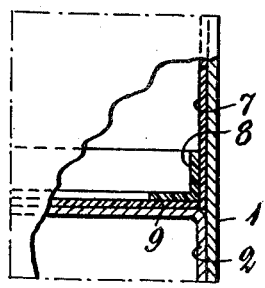
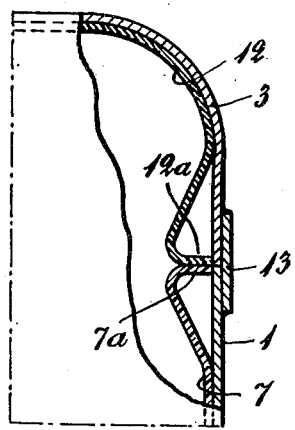
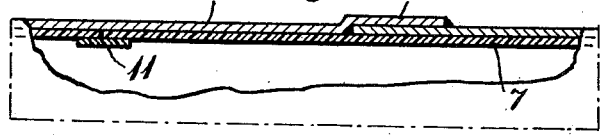
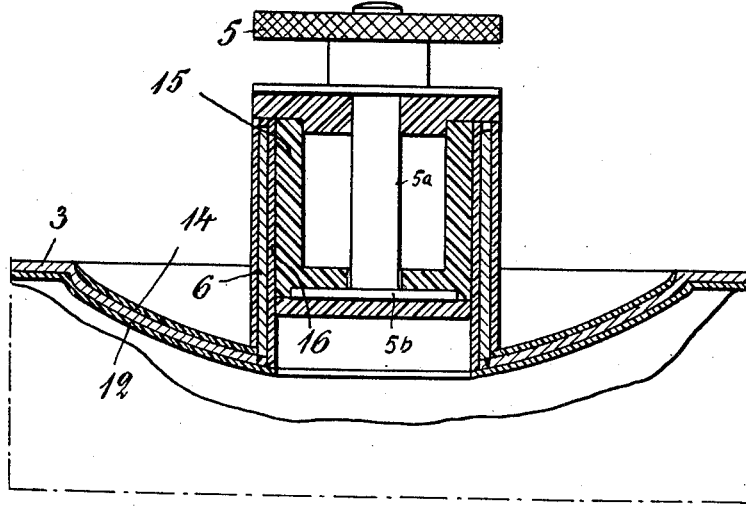

United States Patent Office 2,809,143
Patented Oct. 8, 1957

2,809,143

METHOD OF MAKING HIGH-STRENGTH JOINTS IN LINED CONTAINERS

Stina Signe Birgitta Rahm, born Carlson, Stockholm, Sweden

Application November 24, 1953, Serial No. 394,164

Claims priority, application Sweden November 26, 1952

1 Claim. (Cl. 154—82)

The present invention relates to a new and useful method of producing containers of the type having walls composed of at least two layers of different materials comprising at least one inner layer or liner which is highly resistant to chemical action, and an outer layer or shell of high mechanical strength, and to container structures produced according to this improved method.

For various reasons there is a strong need of replacing containers and carboys made of acid proof glass, stone or ceramic materials as presently in use by containers made of materials of higher mechanical strength. As known, glass and ceramic containers are very brittle which involves particularly severe deficiencies in connection with railway and other conveyance where leakage from, for example, a vessel or carboy containing an acid or other corrosive liquid may give rise to severe damages. From the point of view of economy it is often impracticable to employ, for example, non-corrosive steel instead of glass material. One solution resides in constructing the walls of the container of two layers of different materials comprising an inner layer or liner which is highly resistant to chemical action, and an outer layer or shell having high resistance to mechanical injury. In connection with such lined containers having a comparatively narrow bung opening, however, difficulty is encountered in obtaining effective sealing joints for the liner, since, as a rule, it is impossible to carry out the lining work through the narrow bung opening. In such cases it is necessary to construct the container from at least two parts which are lined individually and subsequently assembled.

The present invention has for its object to obtain, in the production of containers of the type specified, extremely tight and high-strength joints for the liner.

For the object stated, the process according to the invention, comprises the steps of adjoining protruding margins of the inner non-metallic layer or liner along one joint, at least, by hermetically sealing said margins to each other, introducing the margins thus joined into the region within the interior boundary surfaces of the outer layer or shell of the container to be assembled, and then sealing together the adjoining marginal portions of said outer layer or shell still remaining unjoined. The outer layer or shell may be made, for example, of sheet-metal, wood, fibrous material or other material of high strength, and the inner layer or liner may consist of a plastic, synthetic resin or similar material. After having interconnected the parts forming the liner which may take place exteriorly of the container, or in any case before the integration of the outer layer or shell, and which can thus be effected independently of any accessibility to the interior of the container in its assembled condition, the interconnected liner portions are introduced into or enclosed in, the container and finally also the associated outer shell portions are interconnected. According to an embodiment of the invention which is deemed to be of special advantage in certain cases, the walls of the container are built up by a lamination of the outer shell and the liner by bonding, gluing or welding (cementing) the shell to the liner. Thus the said layers consisting of different materials are superimposed on each other and interjoined intimately into an integral laminated structure so as to form a plastic-lined container.

The invention will now be described by way of example, reference being had to the accompanying drawings illustrating a preferred embodiment thereof, and in which:

Fig. 1 is a front elevation of the container, partly in section,

Fig. 2 is a side elevation thereof and

Fig. 3 is a plan view of the same.

Fig. 4 illustrates, on a larger scale, how the bottom portion is connected with the adjoining container section.

Fig. 5 illustrates in a similar manner how the intermediate section of the container is joined together.

Fig. 6 illustrates the joining of the intermediate section to the top section of the container, and Fig. 7, on a still larger scale and in section illustrates the bung opening of the container and its closing device.

Referring to the drawings, the container consists of a body or outer shell of sheet-metal, wood, fibrous material or other durable material and comprising an intermediate section 1, a bottom section 2 and a top section 3 having handles 4. The top section is also provided with a bung opening and an associated spout 6 which is adapted to be closed by a stopper 5 or the like of any suitable well-known type. The three parts 1, 2 and 3 are prefabricated separately, such as by being pressed or stamped, and are internally lined with an acid-proof plastic material in the form, for instance, of polyvinyl chloride, polyethylene, polyisobutylene, polystyrene, phenoplast etc. A co-polymer of polyvinyl chloride or poly-tetrafluoro ethylene or polyvinylene softened polyvinyl chloride has been found to be of particular advantage in this connection, but the invention is not limited to a liner of this type. The plastic material may be flexible or rigid at normal room temperatures.

The bottom section 2 is covered with a disk or film 9 (Fig. 4) of the selected plastic material which could be attached to the sheet-metal backing by bonding, gluing or welding so as to form therewith an integral laminated structure. This attachment could be carried out while applying heat for hardening or curing purpose in accordance with well-known high frequency techniques. The disk 9 is plane or dome shaped according to the shape of the bottom. The annularly closed intermediate section 1 of the container is lined with a plastic web 7 which is attached to the sheet-metal shell in a similar manner and joined at its adjoining margins by welding, gluing or the like. With certain plastic materials, the welding operation can, to advantage, be effected electrically by means of electrodes and high frequency current and, preferably, under the action of a certain pressure, and then a sealing strip 11 (Fig. 5) can be fastened over the joint. Fig. 5 also illustrates an example of joining the meeting ends of the shell wall proper by a lap joint 10.

After lining the bottom section 2 and the intermediate section 1 in the manner just described these sections are interconnected in the manner illustrated in Fig. 4, and an angle-sectioned plastic sealing strip 8 is glued or welded onto the inner corner margins of sections 2 and 1.

Under certain conditions the sections 2 and 1 may also be made in the form of an integral stamping in which case the plastic liner and its application will be modified correspondingly.

The top section 3, being inversely cup-shaped, is similarly lined with plastic material 12 (Fig. 6). The plastic liners 7 and 12 are so dimensioned as to substantially overlap the adjacent edges of the outer shell sections 1 and 3 in the form of collars or extenisons 7a and 12a, respectively. In order to interconnect sections 1 and 3 the overlapping collars 7a and 12a are first extended radially outwardly through the gap between the still unjoined sections 1 and 3 and are then welded together for instance, in the form of a flange-to-flange joint as shown in Fig. 6, and finally the collar portions or extensions 7a, 12a thus welded together are pushed into the space within the sections 1 and 3 which are now interconnected such as by a ring member 13 attached over the margins to be joined by brazing or welding. In the manner described the container is provided with an inner liner completely sealed at all joints. Particularly if the interconnection of the plastic liner sections is effected by high frequency welding or an equivalent welding method a molecular integration will be attained resulting in tight and strong joints.

By way of example Fig. 7 illustrates a suitable method of effecting the lining operation in the region of the bung opening and spout 6. It would be suitable to form the top section 3 with a re-entrant cup-shaped portion in the region of this bung opening and spout 6, and the latter could be internally lined, and possibly also externally covered, with a tubular plastic member 16 which is forced onto the spout and turned over into the same. The edges of member 16 are sealingly connected, on one hand, to the plastic liner 12 and, on the other hand, to a plastic layer 14 which preferably is applied to the bottom of the re-entrant portion.

The bung stopper 5 may for example consist of a nut threaded onto a spindle 5a extending downwardly through a plastic or rubber sleeve 15 and carrying at its lower end a washer 5b. Upon tightening the nut 5 the sleeve 15 will be axially compressed and radially expanded so as to sealingly engage the spout 6 or its liner, respectively. However, the bung closure could take any one of several possible forms.

The shape and dimensions of the container may be varied within a wide range according to the application intended. The plastic liner sections 9 and 7 could be interconnected in a manner similar to that of liner sections 7 and 12.

What I claim is:

A method of producing a container with an outer shell of high mechanical strength and an inner lining highly resistant to chemical action, comprising the steps of first producing at least two separate sections of the container each consisting of an outer shell part and an inner lining part introduced into each of said shell parts with the portion of each of said lining parts nearest to the free edge of its associated shell part being free from firm connection with the adjacent wall portion of the respective associated shell part, forming flanged portions at the free ends of the inner lining parts of said sections, hermetically sealing said flanged portions to each other to provide an integral flange-to-flange joint, pushing the flange joint and the adjacent free portions of the liner parts into the space within said shell parts and bringing the free ends of said shell parts together and thereafter sealing said shell parts to each other.

References Cited in the file of this patent
UNITED STATES PATENTS

| | | |
|---|---|---|
| 2,013,325 | Wilkins | Sept. 3, 1935 |
| 2,149,991 | Dodge | Mar. 7, 1939 |
| 2,160,371 | Schnabel | May 30, 1939 |
| 2,326,137 | Gettelman | Aug. 10, 1943 |
| 2,496,396 | Kassel | Feb. 7, 1950 |
| 2,503,339 | Jandus | Apr. 11, 1950 |
| 2,565,939 | Wriston | Aug. 28, 1951 |
| 2,592,419 | Harper et al. | Apr. 8, 1952 |
| 2,626,885 | Gollings | Jan. 27, 1953 |
| 2,642,911 | De Shazor | June 23, 1953 |